United States Patent Office 3,065,136
Patented Nov. 20, 1962

3,065,136
TREATMENT OF VASCULAR DISEASES WITH 2-AMINOETHANOL-1-NITRATE SALT OF p-TOLUENE SULFONIC ACID
Gillis Stenvall, Malmö, and Olle Mårtensson, Uppsala, Sweden, assignors to Aktiebolaget Pharmacia, Uppsala, Sweden, a company of Sweden
No Drawing. Filed Feb. 12, 1958, Ser. No. 714,710
6 Claims. (Cl. 167—65)

This invention relates to a novel therapeutic composition for the treatment of angina pectoris and similar diseases of vascular origin. More particularly, the invention relates to an oral therapeutic composition for this purpose containing 2-aminoethanol-1-nitrate of p-toluenesulphonate as the active component in unit dosage form.

As is well known, the hitherto most commonly used agent for treatment of angina pectoris is nitroglycerine. It is very effective and quick-acting. When administered orally, usually in doses of about 0.25 mg., it has an almost instantaneous coronardilatory effect, the effective duration of a single dose being about 15 to 20 minutes. In view hereof, nitroglycerine is a very valuable agent for treating attacks of angina pectoris.

However, nitroglycerine is rather toxic and it has rather poor stability characteristics. Being a first class explosive it is naturally a labile compound which may be subject to decomposition and even detonation if stored under unfavorable conditions. Further, it is strongly hygroscopic and extremely sensitive to moisture and traces of moisture are sufficient to start hydrolysis of the compound. It is also very sensitive to metals which may catalytically promote an oxidative decomposition of the compound. Further, even when stored in the form of tablets, losses of nitroglycerine occur due to its volatility.

One of the principal objects of the present invention is to provide a novel therapeutic composition which is as effective as nitroglycerine in the treatment of angina pectoris. A further object of this invention is to provide such a composition which has a high stability and the composition of which remains practically constant during storage. A still further object of the invention is to provide such a composition containing as its active component 2-aminoethanol-1-nitrate of p-toluenesulphonate. These and other objects are accomplished by utilizing the individual components and combinations of components set forth in the following description, wherein several preferred embodiments are set forth in detail.

It has been found, according to this invention, that the novel compound 2-aminoethanol-1-nitrate of p-toluenesulphonate is a highly effective agent for the treatment of angina pectoris and similar diseases of vascular origin. In addition, this compound has very valuable stability properties; it is non-explosive, non-hygroscopic and practically insensitive to moisture and also stable against oxidative influences. Consequently, there is no risk of decomposition or spontaneous combustion of the compound when stored, or decomposition caused by other reasons. Moreover, this compound has a lower toxicity than nitroglycerine.

The novel compound 2-aminoethanol-1-nitrate of p-toluenesulphonate constitutes the active ingredient of the novel therapeutic composition in accordance with this invention and this compound generally is believed to correspond to the formula:

It has a molecular weight of about 278.3. The substance consists of white crystals with a melting point of about 131–133° C. It is readily soluble in water and ethyl alcohol, sparingly soluble in acetone and chloroform, slightly soluble in benzene and ethyl acetate and practically insoluble in ether and petroleum ether. When administered orally, it is readily absorbed by the body.

Clinical investigations have proved that the compound 2-aminoethanol-1-nitrate of p-toluenesulphonate is an effective agent in the treatment of angina pectoris and an excellent prophylactic for the prevention of attacks of angina pectoris. The effective clinical dose is from about 1 mg. and 4 mg. It is preferably administered in unit doses of from about 1 mg. to about 4 mg., e.g. in the form of tablets containing 1 or 4 mg., respectively, of the active substance in daily doses of ½ to 3 or 4 tablets. It may also be administered in the form of a liquid composition, preferably of such a concentration that each single drop contains about 1 mg. of the active substance. In the case of tablets the therapeutic effect begins after about 5 minutes, and when using a liquid composition the therapeutic effect is instantaneous. The effective duration of a single dose is in both cases usually about 2 to 3 hours. When necessary, multiple does may be administered, e.g. in case of using tablets in daily doses which total about 12 mg. and when using a liquid composition in doses which total about 8 mg. daily of the active substance.

The composition according to the invention comprises in admixture with the active substance, 2-aminoethanol-1-nitrate of p-toluenesulphonate, any well known pharmaceutical solid or liquid diluent. In addition, the composition may preferably contain a small amount of pH regulator, for example citric acid, to regulate the pH within a preferred range to obtain a practically constant composition of the mixture, independent of the period of storage. Said pH regulator may be added in an amount sufficient to produce a pH in the composition within the range of from about 2 to about 5, and preferably within the range of 2.5 to 3.5.

The preparation of the compound 2-aminoethanol-1-nitrate of p-toluenesulphonate serving as the active ingredient of the composition according to the invention may suitably be carried out as follows:

85 g. of nitrate of monoethanol amine nitrate (actually: nitrate of nitric acid ester of monoethanol amine) are dissolved in 300 ml. water, the basic ester being released by the addition of an alkali hydroxide (e.g. sodium hydroxide) and extracted with four 200 ml. batches of ethyl ether. The combined ethyl ether extracts are dried with potassium carbonate. To the dried solution is then added a cold solution of 100 g. of 96% p-toluene sulphonic acid in 250 ml. of acetone, while cooling and stirring effectively. A reaction occurs and the 2-aminoethanol-1-nitrate of p-toluenesulphonate thus formed usually precipitates in crystalline form; if it is precipitated as an oil it crystallizes as a rule after a few hours. The raw product is obtained in a yield of about 75% and has a melting point of about 123–126° C. After recrystallization from ethyl alcohol, 80–85 g. of the pure substance is obtained with a melting point of about 132–133° C.

The reactions taking place in this conversion may be illustrated as follows:

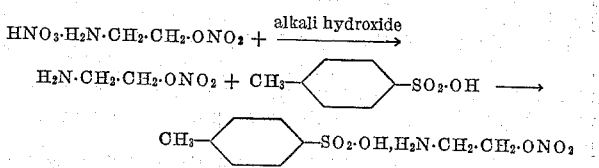

When preparing the composition according to the invention in tablet form, the active compound 2-aminoethanol-1-nitrate of p-toluenesulphonate is admixed with conventional solid diluents and tableting adjuvants, such as lactose, starch, stearic acid, talc and, preferably, a small amount of a pH regulator, such as citric acid, as indicated above. Further, coloring and flavouring substances may be added.

As an example of the preparation of tablets the following may be mentioned.

2 g. of p-toluene sulphonate of monoethanol amine nitrate and 0.7 g. of citric acid are ground to a particle size passing through a 50-mesh sieve. 65 g. of lactose and 34 g. of potato starch are then added thereto and the whole mass is carefully mixed and granulated with a 10% alcoholic solution of stearic acid which may contain a small amount of a coloring substance. The granulate is dried at room temperature and thereupon ground to a particle size passing through a 20-mesh sieve. 10 g. of talc are then added and also a further amount (8.3 g.) of potato starch, to obtain a batch sufficient for 1000 tablets, each tablet containing 2 mg. of the active substance. This tablet mass is carefully mixed and tablets are then compressed therefrom by the aid of 8 mm. scored concave punches. Each of these tablets contains:

| | Mg. |
|---|---|
| 2-aminoethanol-1-nitrate of p-toluenesulphonate | 2 |
| Citric acid | 0.7 |
| Lactose | 65 |
| Potato starch | 42.3 |
| Talc | 10 |

The weight of one tablet is about 0.12 g.

In a similar manner tablets, each containing 4 mg. of the active substance, may be prepared from the same ingredients in such proportions that the composition of each tablet will be as follows:

| | Mg. |
|---|---|
| 2-aminoethanol-1-nitrate of p-toluenesulphonate | 4 |
| Citric acid | 1 |
| Lactose | 100 |
| Potato starch | 65 |
| Talc | 10 |

The weight of one tablet is about 0.18 g.

It has been found that tablets of the above compositions possess a very high stability. They may be stored for a year at room temperature without any change in either the content or effectiveness of the active substance 2-aminoethanol-1-nitrate of p-toluenesulphonate. They have also proved to be practically stable even when stored at a temperature as high as 40° C. for 5 or 6 months.

The preparation of a liquid composition for oral administration according to the invention may be effected, for example, by dissolving:

| | G. |
|---|---|
| 2-aminoethanol-1-nitrate of p-toluenesulphonate | 2.8 |
| Citric acid | 0.1 |
| Glycerol | 5.0 | in 15.0 g. of 95% ethanol and diluting the solution so obtained by addition of distilled water to a volume of 100 ml.

Each drop (1/28 ml.) of this composition contains 1 mg. 2-aminoethanol-1-nitrate of p-toluenesulphonate.

The pH of this solution is about 3.0. It has been proved that the storage of the liquid composition for one year at 40° C. still retains the initial amount of the active substance. Consequently, it can be considered to be practically indefinitely stable when stored at normal temperatures.

Naturally, the solution may also be prepared with other concentrations of the active substance, for example 10–40 mg. per ml., or in such a dilution that it contains 1 mg. of 2-aminoethanol-1-nitrate of p-toluenesulphonate per ml.

We have also prepared injection solutions of the novel compositions and compounds of this invention as follows:

2.1 g. of 2-aminoethanol-1-nitrate of p-toluenesulphonate, 7 g. of sodium chloride, 1.0 ml. M/1. of hydrochloric acid and 0.1 g. citric acid are dissolved in sterile water and diluted with sterile water to a volume of 1 liter. The pH of this solution is about 3.0. The solution may be sterilized by sterile filtering or by heating to about 100° C. for 30 minutes or by heating in autoclave at 120° C. for 20 minutes. It has been found that a solution prepared as indicated and sterilized in the specified manner may be stored practically indefinitely without changing its composition or therapeutic effectiveness. Generally, the pH of the injection solution should be within the range of about 2.5 to 3.5.

About 150 people have been clinically tested with the new composition according to the invention for treatment of angina pectoris. In most cases it has been administered in the form of tablets, generally one tablet containing 4 mg. of the active substance 2 or 3 times a day. The tablets have been taken in different ways: on an empty stomach or after a meal, sublingually, chewed up before swallowing, or swallowing of the tablet unbroken. There has been no marked difference in effect between these cases, and generally the therapeutic effect has begun after about 5 minutes.

When using the liquid composition, it has been applied in the form of drops onto the tongue or on a sugar piece and generally given in daily doses of from 4 to 8 drops, each containing 1 mg. of the active substance. The therapeutic effect in this case is instantaneous.

Both in case of tablets and the liquid composition, the effective duration of a dose is about 2 to 3 hours.

As a summary, the results of the clinical tests have proved that the composition according to the invention is a very effective and valuable prophylactic in the treatment of angina pectoris.

In conclusion, while the foregoing specification describes several preferred embodiments of the instant invention, it is to be understood that we do not intend to limit ourselves to the particular embodiments herein disclosed, since those skilled in the art may readily alter certain features without really departing from the basic principles and novel teachings of this invention, and we therefore intend to encompass all changes, variations, modifications and equivalents falling within the scope of the appended claims.

What is claimed is:

1. The 2-aminoethanol-1-nitrate salt of p-toluene sulfonic acid of the following formula:

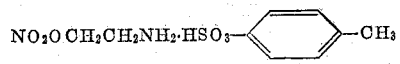

2. A composition of matter comprising at least 1 mg. of 2-aminoethanol-1-nitrate salt of p-toluene sulfonic acid and a pharmaceutical carrier.

3. A composition of matter comprising at least 1 mg. of the 2-aminoethanol-1-nitrate salt of p-toluene sulfonic acid and a pharmaceutical carrier, said pharmaceutical carrier containing a non-toxic acid in quantity sufficient to produce a pH within the range of about 2 to about 5 in said composition of matter.

4. A composition of matter according to claim 3 wherein the non-toxic acid is citric acid.

5. A process comprising neutralizing the compound 2-aminoethanol-1-nitrate with a substantially equivalent quantity of p-toluene sulfonic acid and recovering the formed salt of the formula:

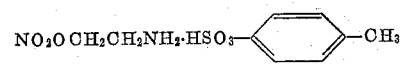

6. The method of treating human beings suffering from angina pectoris and similar diseases of vascular origin which comprises administering to said human beings small doses of the stable, non-hygroscopic, non-volatile 2-aminoethanol-1-nitrate salt of p-toluene sulfonic acid.

References Cited in the file of this patent

Bovet: Chem. Abs. 41, 1947, page 3868c.